Patented Dec. 27, 1949

2,492,208

UNITED STATES PATENT OFFICE 2,492,208

PROCESS OF EXFOLIATING AND BLEACHING VERMICULITE

Joseph B. Barnes, Colorado Springs, Colo.

No Drawing. Application April 16, 1945,
Serial No. 588,705

6 Claims. (Cl. 23—110)

This invention relates to a plastic filler produced by pyrochemically exfoliating and bleaching vermiculite, the primary object of the invention being to provide a novel filler of this character by means of novel and efficient treatment of vermiculite mica.

The filler is a chemically exfoliated vermiculite which is attractive, ornamental, and useful when mixed into a translucent or transparent plastic. During the process of exfoliation the vermiculite is broken into microscopically thin flakes which are translucent, to transparent, giving the mass a beautiful sparkling depth of color. This product will dye any color, easily, thus enhancing its natural beauty. Such a product could be used in a transparent or translucent plastic for making novelties, book ends, reading lamps, lamp shades fixtures, tile, pencils and fountain pens, jewelry.

The process of the invention consists in immersing dirt-free vermiculite in a boiling nitric acid solution of specific gravity between 1.02 and 1.42 until the vermiculite is exfoliated and bleached.

When iron impurities are present the process may be improved by adding from 1% to 20% of phosphoric acid to the nitric acid solution used.

After exfoliation and bleaching has taken place the acid solution is drained off and the vermiculite washed in water to remove the acid.

At this stage a better product may be obtained by immersing the exfoliated and bleached vermiculite in a 1% to 20% solution of citric or tartaric acid. The acid is drained off and the vermiculite rinsed in water, following which the vermiculite is neutralized with a slight excess of ammonium hydroxide or other suitable base.

The purpose of the tartaric or citric acid at this stage of the process is to prevent the precipitation of iron hydroxides or oxides when the acids are neutralized with a base.

The length of time for which the vermiculite is immersed in the nitric acid is a variable factor, depending on the temperature and strength of the acid. In the case of a boiling 20 to 30 percent solution of nitric acid it usually takes about five to fifteen minutes to exfoliate vermiculite. A longer length of time does not seem to injure or damage the product.

Vermiculite is an altered or weathered mica with a water or crystallization, or a moisture content. It is this moisture content which causes vermiculite to exfoliate when heated in a flame. A fully weathered and altered mica would eventually form a chlorite. Vermiculite is an in-between product made by nature partly weathering the mica. Therefore, the different vermiculites will take more or less time to react in acid, depending on their degree of alteration.

When nitric acid, plus phosphoric acid, is employed, laboratory tests show that this solution is a faster acting bath than a straight nitric acid solution, so that less time to exfoliate the vermiculite is required. In a boiling 20 to 30 percent. solution of nitric acid, plus the added 5 to 10 percent. solution of phosphoric acid, vermiculite will usually exfoliate in from three to ten minutes. A somewhat better bleaching effect is obtained by using this combination solution of acids, which is probably due to the action of phosphoric acid on iron impurities often found in mica.

The duration of immersion of the exfoliated vermiculite in the tartaric or citric acid varies with the temperature of the bath, inasmuch as the chemical action is usually double with each increase of 20 degrees of temperature. The purpose of the tartaric or citric acid treatment is to prevent the precipitation of iron hydroxide when the acids are neutralized by alkaline solutions. Iron hydroxide is brown, and would stain the bleached, exfoliated vermiculite. In laboratory tests a 10 or 20 percent. tartaric or citric acid was left in contact with treated vermiculite for from fifteen minutes to an hour at 70 to 80 degrees, F.

The cost of manufacturing the present vermiculite filler may be greatly reduced by using a 1 to 5 percent. solution of citric acid or tartaric acid, and extending the immersion time from six to eight hours. Due to lack of uniformity in the qualities of vermiculite, immersion time is necessarily a variable factor. By the use of pressure the temperature of the acid may be increased and the strength of the acid reduced below the stated limits of 4% nitric or sp. gr. 1.02. A 1% nitric acid has a sp. gr. of 1.0036.

It is to be understood that the percentages given above are by weight.

Having thus described the invention, what is claimed is:

1. Process of exfoliating and bleaching vermiculite which consists in immersing the vermiculite until exfoliated and bleached, in a nitric acid solution containing 1% to 20% of phosphoric acid.

2. Process of exfoliating and bleaching vermiculite comprising immersing the vermiculite in a bath consisting of a nitric acid solution having a specific gravity between 1.02 and 1.42, and 1% to 20% of phosphoric acid.

3. Process of exfoliating and bleaching vermiculite comprising immersing the vermiculite in a bath consisting of a nitric acid solution of a specific gravity between 1.02 and 1.42 and 1% to 20% of prosphoric acid, then draining off the acid and rinsing the vermiculite in water.

4. Process of exfoliating and bleaching vermiculite comprising immersing the vermiculite in a bath consisting of a nitric acid solution of a specific gravity between 1.02 and 1.42 and 1% to 20% of phosphoric acid, then draining off the acid and rinsing the vermiculite in water and neutralizing the acids remaining in the vermiculite with a suitable base.

5. Process of exfoliating and bleaching vermiculite comprising immersing the vermiculite in a bath consisting of a ntiric acid solution of a specific gravity between 1.02 and 1.42, and 1% to 20% of phosphoric acid, then draining off the acid and rinsing the vermiculite in water, then immersing the vermiculite in a 1% to 20% solution of citric acid, draining off the acid, and neutralizing the remaining acids in the vermiculite.

6. The process which comprises exfoliating and bleaching vermiculite by immersing the vermiculite in an acid bath containing nitric acid and phosphoric acid.

JOSEPH B. BARNES.

REFERENCES CITED

The following references are of record in the file of this patent:

UNITED STATES PATENTS

| Number | Name | Date |
|---|---|---|
| 1,987,221 | Stroehlke | Jan. 8, 1935 |
| 2,366,217 | Ruthruff | Jan. 2, 1945 |

OTHER REFERENCES

Groves: "Exfoliation of vermiculite by chemical means," Nature, vol. 144 (1939), page 554.